United States Patent [19]

Wilkins

[11] Patent Number: 4,765,263
[45] Date of Patent: Aug. 23, 1988

[54] APPARATUS FOR PLACEMENT OF FERTILIZER BELOW SEED WITH MINIMUM SOIL DISTURBANCE

[75] Inventor: Dale E. Wilkins, Pendleton, Oreg.

[73] Assignee: The United States of America as represented by the Secretary of Agriculture, Washington, D.C.

[21] Appl. No.: 876,047
[22] Filed: Jun. 19, 1986
[51] Int. Cl.$^4$ .................... A01C 23/02; A01C 5/00
[52] U.S. Cl. ........................ 111/86; 111/73
[58] Field of Search ............ 111/73, 80, 86, 7, 87; 172/699

[56] References Cited

U.S. PATENT DOCUMENTS

| | | | |
|---|---|---|---|
| 1,229,604 | 6/1917 | Garst | 111/80 |
| 1,893,512 | 1/1933 | Zuckerman | 111/73 |
| 1,906,767 | 4/1933 | Traphagen | 111/73 |
| 2,159,652 | 5/1939 | Brunner | 111/73 |
| 2,619,054 | 11/1952 | Bell | 111/7 |
| 2,869,489 | 1/1959 | Buhr | 111/80 |
| 3,220,368 | 11/1965 | Gandrud | 111/9 |
| 3,251,325 | 5/1966 | Hyland | 111/86 |
| 3,439,636 | 4/1969 | Lemke | 111/7 |
| 3,797,418 | 3/1974 | Bridger, Jr. | 111/73 |
| 3,908,567 | 9/1975 | Brannan | 111/7 |
| 4,127,073 | 11/1978 | Blair | 111/7 |
| 4,132,181 | 1/1979 | Smith et al. | 111/7 |
| 4,278,036 | 7/1981 | Buchele | 111/52 |
| 4,388,878 | 6/1983 | Demzin | 111/86 |
| 4,417,530 | 11/1983 | Kopecky | 111/73 |
| 4,565,141 | 1/1981 | Kopecky | 111/86 |
| 4,580,507 | 4/1986 | Dryer | 111/73 |
| 4,638,748 | 1/1987 | Kopecky | 111/86 |
| 4,653,412 | 3/1987 | Clarke | 111/73 |
| 4,671,193 | 6/1987 | States | 111/73 |

OTHER PUBLICATIONS

D. E. Wilkins, G. A. Muilenburg, B. L. Klepper, and P. E. Rasmussen, "Deep Furrow Opener for Placement of Fertilizer," 1981 Research Report-Columbia Basin Agricultural Research Special Report 623, Agricultural Experiment Station Oregon State University, Jun. 1981, pp. 51–55.

B. Klepper, P. E. Rasmussen, and R. W. Rickman, "Fertilizer Placement for Cereal Root Access," *Journal of Soil and Water Conservation*, vol. 38, pp. 250–252 (1983).

Primary Examiner—Richard J. Johnson
Attorney, Agent, or Firm—M. Howard Silverstein; David G. McConnell; Margaret A. Connor

[57] ABSTRACT

An apparatus and method are described which allow for placement of fertilizer at an optimum separation distance below seed at the time of seeding with a minimum of soil disturbance so that the creation of high ridges adjacent to the seed row is avoided. The apparatus includes a narrow first furrow opener for opening a narrow furrow for fertilizer; a wider second furrow opener attached to the first furrow opener for opening a seed furrow above the first furrow simultaneously in time and at a slightly differential position; a feed tube attached to the trailing edge of the first furrow opener for feeding fertilizer into the fertilizer furrow as it is opened, and a seed deflector for deflecting seeds rearward so that they do not fall into the seed furrow before the fertilizer furrow is filled with soil. The device can be used with existing implement shanks such as a grain drill opener shank.

14 Claims, 3 Drawing Sheets

APPARATUS FOR PLACEMENT OF FERTILIZER BELOW SEED WITH MINIMUM SOIL DISTURBANCE

BACKGROUND OF THE INVENTION

1. Field of the Invention

The present invention relates to a novel method and apparatus that permits application of fertilizer below seed at the time of seeding with a minimum of soil disturbance.

2. Description of the Art

The precise placement of fertilizer and seed is critical for the efficient use of fertilizer and for enhanced plant growth especially in conservation tillage systems which have crop residue on or near the soil surface. Fertilizer placed on or near the surface gets tied up in the decomposition of crop residue and therefore is not available for the young plants. Fertilizer placed in high concentrations next to the seeds can result in toxic effects to the seedlings. For example, if the concentration of fertilizer is too high close to the developing seedling, germination and emergence can be depressed. This toxic effect of fertilizer is greatest for hot and dry seedbeds such as encountered in early fall planting in summer fallowed systems.

Klepper et al., in the *Journal of Soil and Water Conservation*, Vol. 38, pp. 250–252 (1983), describe the optimum placement of fertilizer for cereal grain production on silt loam soil as 3 to 5 cm below the seed or 3 cm below and up to 5 cm to one side. Factors such as soil water content, soil temperature, proximity of the fertilizer to plant roots, and type and concentration of fertilizer influence the fertilizer toxicity problem to young seedlings.

Placement of fertilizer at the time of seeding is recognized as an important means to improve crop production and reduce the number of field operations. Present planting devices that place fertilizer at seeding time are of two types, those that use separate soil engaging tools for placement of seed and fertilizer and those that use a single soil engaging tool to place both fertilizer and seed. The devices that have separate soil engaging tools are not suited to soil and water conservation production systems that leave crop residue on the soil surface to reduce the volume and velocity of water runoff. Separate soil engaging tools for seed and fertilizer bury more crop residue and crop residue becomes tangled in the openers more easily than with a single soil engaging tool for placement of seed and fertilizer.

Known devices for placement of seed and fertilizer through one soil engaging tool include U.S. Pat. No. 3,908,567; U.S. Pat. No. 4,388,878; U.S Pat. No. 3,797,418; U.S. Pat. No. 4,278,036; U.S. Pat. No. 4,417,530, and U.S. Pat. No. 4,565,141.

U.S. Pat. No. 3,908,567 shows an apparatus which includes a plurality of chisel-shaped applicator knives to which dry fertilizer or seeds are fed. Liquid ammonia is fed to a conduit behind each knife and directed onto a ribbon of the dry particulate matter deposited at the bottom of each channel formed by the knives. This apparatus does not provide means for placing fertilizer an adequate distance from the seed and therefore there is a high potential for fertilizer toxicity problems to the germinating seed especially from the ammonia gas used to help discharge the particulate matter.

U.S. Pat. No. 3,797,418 shows a minimum tillage planter which includes a forward-oriented disk coulter, a delta-wing-shaped seed opener, and a fertilizer opener contiguously mounted aft of the seed opener having wing-like members forming planar continuations of the wing portions of the seed opener. This planter does not provide means for placing fertilizer below the seed where the developing plant roots will have ready access to the fertilizer.

U.S. Pat. No. 4,388,878 discloses a seeder foot assembly which includes a furrow opening body portion and a plurality of feed tubes located behind, one above the other, for discharging materials such as seed, fertilizer, and herbicides into the soil. U.S. Pat. No. 4,278,036 shows a rotary tiller slot planter which includes a subsoil shank which forms an initial trench and includes a fertilizer tube for depositing fertilizer in the trench, and a seed tube shank including a seed tube and insecticide tube therein for depositing seed and insecticide above the fertilizer. The main disadvantage of these devices is that they cause excessive soil disturbance during placement of fertilizer and seed.

U.S. Pat. No. 4,417,530 and U.S. Pat. No. 4,565,141 show planting devices which include a chisel type furrow opener and a shank having a first delivery tube for delivery of fertilizer and a second delivery tube behind the first tube for delivery of seed behind and above the fertilizer. U.S. Pat. No. 4,565,141 further includes a seed bed packing plate for covering the fertilizer with soil prior to seeding. These devices are not suitable for seeding into soil conditions that have dry soil in the top 5 to 10 cm and crop residue on the surface for erosion control. Excessive amounts of soil are disturbed in order to place the fertilizer below the seed and have the seed in contact with soil sufficiently moist to germinate the seed and produce seedling emergence. The excessive soil disturbance results in reducing valuable crop residue on the soil surface, leaving the soil surface rough and promoting loss of soil water from the seed zone.

Wilkins et al. (1981 Research Report - Columbia Basin Agricultural Research Special Report 623, pp. 51–55) describe a USDA modified deep furrow opener to simultaneously place seed and fertilizer in the soil with the fertilizer below the seed. This opener includes a shank for attachment to a grain drill, an opener attached to the front of the shank for opening a furrow, a fertilizer tube extending through the shank for feeding fertilizer into the furrow, and means for directing seed into the soil at a distance behind and above the fertilizer. The primary disadvantage of this opener is that it causes a large volume of soil to be disturbed during placement of fertilizer and seed, resulting in the creation of high ridges adjacent to seed rows. This contributes to increased soil erosion, reduction of valuable crop residue at the surface, increase in loss of soil water, and creation of a rough soil surface.

SUMMARY OF THE INVENTION

The invention described herein includes a method and apparatus for obviating the above problems. The invention provides means for opening a narrow fertilizer furrow, for substantially simultaneously opening a wider seed furrow above the fertilizer furrow, and for feeding fertilizer and seed into the furrows. The unique features of the invention make it possible to precisely place fertilizer at the optimum distance below the seed at time of seeding while minimizing soil disturbance.

The apparatus of the invention comprises a first furrow opening means for opening a narrow furrow in the soil for placement of fertilizer; a second furrow opening means attached to the first furrow opening means for substantially simultaneously opening a second wider furrow above the fertilizer furrow for placement of seed; fertilizer feeding means attached to the first furrow opener for depositing fertilizer into the fertilizer furrow, and seed deflecting means for preventing seeds from falling into the seed furrow before the fertilizer furrow is filled with soil. The apparatus utilizes a seed feeding means connected to the second furrow opener to feed seed into the seed furrow.

The method of the invention comprises opening a narrow first furrow for placement of fertilizer; substantially simultaneously opening a second wider furrow above the fertilizer furrow for placement of seed; feeding fertilizer into the fertilizer furrow, and feeding seed into the seed furrow after soil has filled the fertilizer furrow.

The unique features of the invention make possible the placement of fertilizer at the optimum separation distance below seed at the same time as placement of seed at planting time, while minimizing soil disturbance. The simultaneous placement of seed and fertilizer has the advantages of making efficient use of fertilizer, improving crop production, and reducing the number of field operations. With the invention, fertilizer and seed can be placed at the optimum separation distance, that is, close enough to maximize the beneficial effects of the fertilizer on the seed and emerging seedling and far enough apart so that toxic effects of the fertilizer on the seed or seedling are minimized.

A primary advantage of the invention is that the volume of soil disturbed during placement of fertilizer and seed is significantly reduced compared to prior art devices, and consequently the creation of high ridges adjacent to seed rows is avoided. This is important because excessive soil disturbance can result in increased soil erosion, reduction of valuable crop residue at the surface, promotion of loss of soil water from the seed zone, and creation of a rough soil surface which is undesirable for later field operations such as harvesting. On steep slopes, excessive soil disturbance causes additional problems because the disturbed soil can flow over adjacent rows and cover seeds too deeply.

The invention has the further advantages of providing means for placing fertilizer and seed at the optimum distances below the soil surface. This is important because improper placement of fertilizer can result in increased weed germination and growth, the tying up of the fertilizer in the decomposition of surface residues, and toxic effects to the seedling. Improper placement of seeds can result in depression of germination and emergence.

Another advantage of the invention is that it can be used with existing opener shanks such as a grain drill opener shanks for ready attachment to the lift frame of seeding machines.

In accordance with this discovery, it is an object of the invention to provide a method and apparatus for the simultaneous placement of fertilizer in the soil and placement of seed above the fertilizer while minimizing soil disturbance.

It is also an object of the invention to provide means to place the seed and fertilizer at an optimum distance from each other and at the appropriate distances from the soil surface.

It is another object of the invention to provide means to minimize soil disturbance during the placement of seed and fertilizer and thereby reduce soil water loss, reduce erosion, maintain a maximum of valuable crop residue of the soil surface, and avoid the creation of high ridges adjacent to the seed row.

It is also an object of the invention to provide a furrow opening device with the above advantages which can be used for planting a wide variety of row crops with known seeding machines with minimal equipment modification.

Other objects and advantages will become readily apparent from the ensuing description.

DETAILED DESCRIPTION OF THE INVENTION

Figure 1:
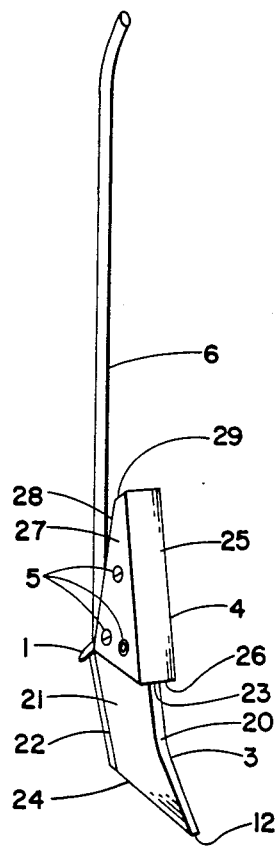
FIG. 1 is a perspective view of the apparatus of the invention.

The apparatus and method of the invention are next described in detail with reference to the attached drawings.

Referring to FIGS. 1-6, the apparatus of the invention includes first furrow opening means 3 for opening a narrow furrow for placement of fertilizer; second furrow opening means 4 attached to the fertilizer furrow opening means for substantially simultaneously opening a second wider furrow above the fertilizer furrow for placement of seed; fertilizer feeding means 6 attached to the fertilizer furrow opener for depositing fertilizer into the fertilizer furrow, and seed deflecting means 1 for preventing seeds from falling into the seed furrow before the fertilizer furrow is covered with soil. Reference to fertilizer is by way of example, not limitation. Other chemical or biological soil amendments such as insecticides, fungicides, nematocides, plant growth regulators, and the like, can be fed through tube 6 into the furrow opened by first furrow opener 3.

Figure 2:
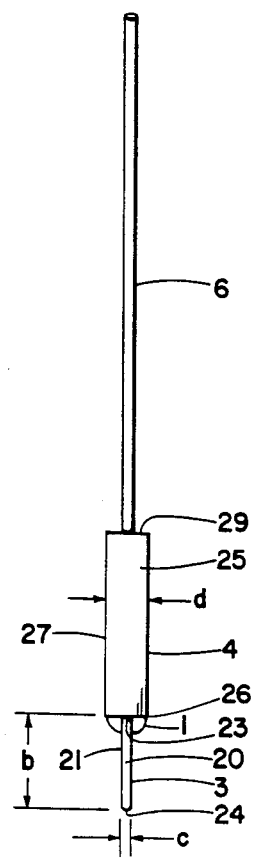
FIG. 2 is a front view of the apparatus of the invention.

Referring to FIGS. 1-2, first furrow opener 3 for opening a narrow furrow for placement of fertilizer includes a leading face 20 which terminates in opener edge 12 which is the forward-most soil engaging edge of the apparatus, flat side faces 21, trailing face 22, flat top face 23, and bottom face 24. As shown in FIG. 1, leading face 20 is an elongated rectangular face. In the alternate embodiment shown in FIGS. 3-4, leading face 20 has been sharpened to a knife edge to more easily open a narrow furrow. As clearly shown in FIGS. 1, 3, and 6, viewing first furrow opener 3 from the side, face 20 presents a concave leading edge. This gives a lifting action as the soil fails and helps prevent soil compaction.

Figure 4:
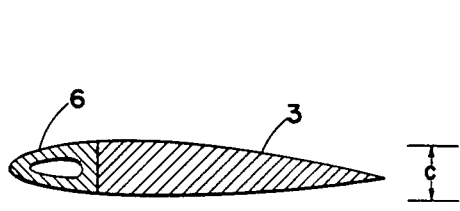
FIG. 4 is an enlarged sectional view taken on line 4—4 of FIG. 3.

The width of the first furrow opener, dimension c, plays an important role in determining the amount of soil disturbance created when the fertilizer furrow is opened, and consequently in determining the height of ridges adjacent to the seed row which occur after soil has covered the seed furrow. This width should be narrow so that a minimum amount of soil is disturbed when the fertilizer furrow is opened. The minimum width is determined in part by the width of fertilizer feeding means 6 attached to the trailing face of 3 and by the strength and wear resistance of the material from which 3 is made. The fertilizer furrow opened by 3 must be sufficient to provide room for the fertilizer tube 6 to deliver fertilizer into the furrow. The portion of the fertilizer tube attached to the first furrow opener can be flattened as shown in FIG. 4 to reduce its thickness and thereby reduce the width of the first furrow opener.

Figure 3:
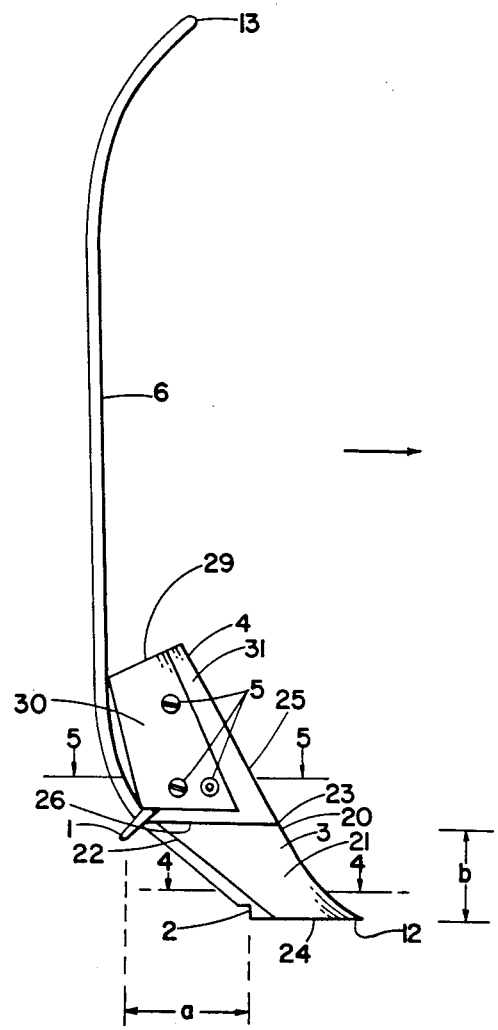
FIG. 3 is a side view of an alternate embodiment of the apparatus of the invention.
Figure 5:
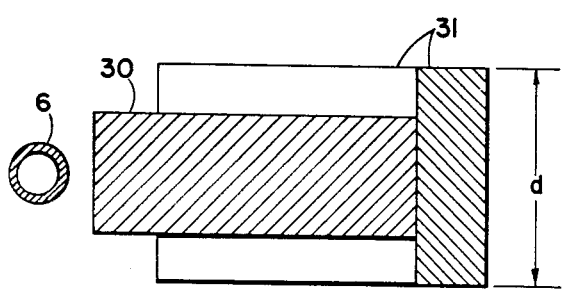
FIG. 5 is an enlarged sectional view taken on line 5—5 of FIG. 3.

Second furrow opener 4 for substantially simultaneously opening a second wider furrow above the fertilizer furrow for placement of seed includes elongated rectangular flat leading face 25 which meets tangentially with leading face 20 of the first furrow opener, flat bottom face 26 which is fixedly centered to the top face (23) of the first furrow opener, flat side faces 27, trailing face 28, and top face 29. Mounting holes 5 are located in side faces 27 for attaching the apparatus to an implement shank. As shown in FIGS. 3 and 5, an alternate embodiment of the second furrow opener 4 includes body portion 30 and seed furrow forming portion 31 located at the leading and bottom faces of opener 4 and wider than body portion 30. Leading face 25 is pitched back to form a lift angle which gives a lifting component as the soil fails and thereby helps to prevent soil compaction in the root zone. The lift angle also aids in moving materials such as dry soil and/or crop residue away from the seed furrow to promote good seed germination and emergence and aids in creating a self-filling furrow.

Figure 6:
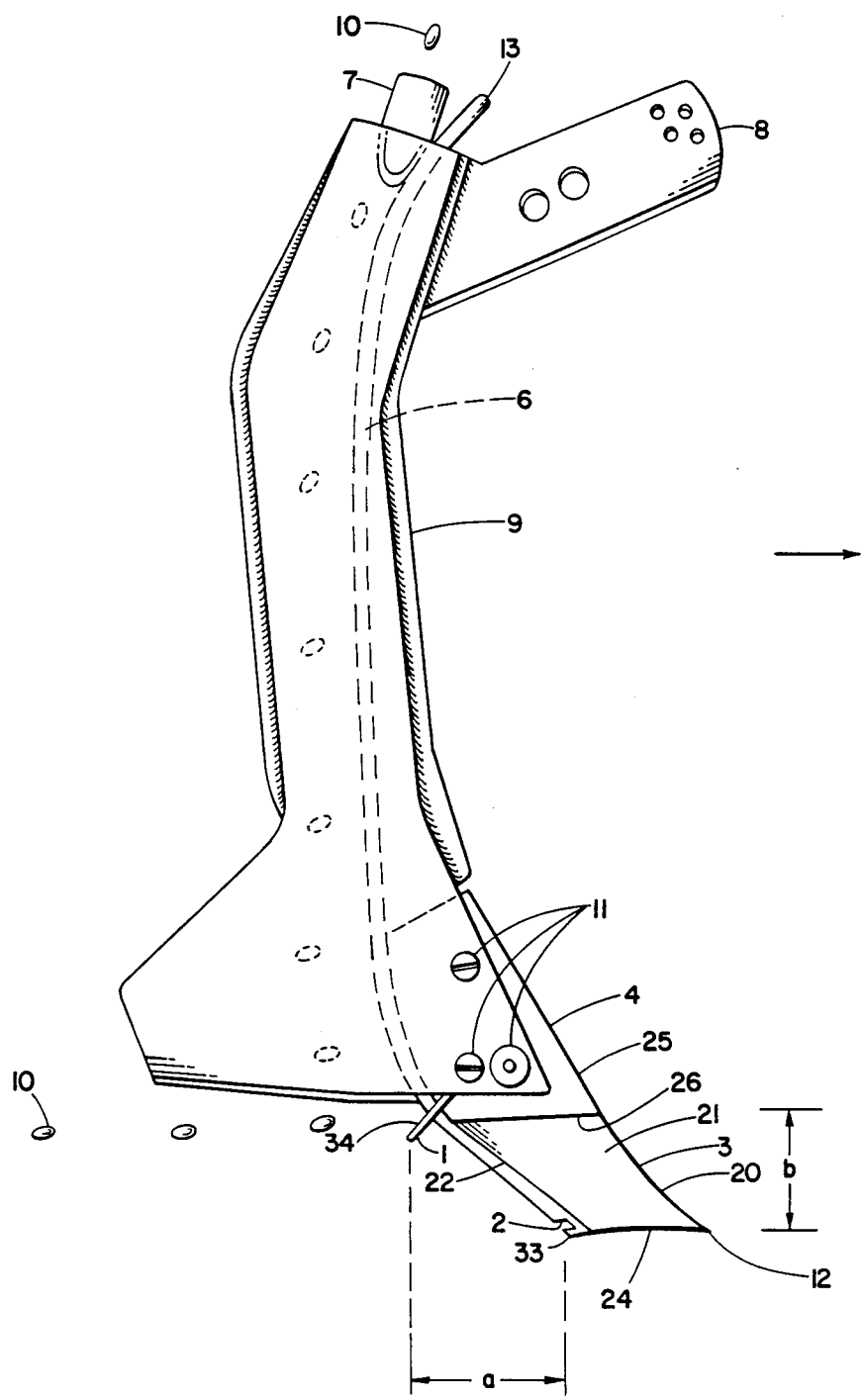
FIG. 6 is a side view of the apparatus of the invention which includes an opener shank.

The width of the second furrow opener, dimension d, determines the amount of soil disturbance created when the seed furrow is opened above the fertilizer furrow. The second furrow opener must be sufficiently wide to move dry surface soil and crop residue away from the seed furrow and sufficiently narrow so as not to disturb excessive amounts of soil so that high ridges adjacent to the seed row are avoided. As shown in FIG. 6, bottom face 26 can be angled downward slightly to the rear to aid in controlled compression of soil into the fertilizer furrow.

Fertilizer feeding means 6 is a downwardly extending tube for feeding fertilizer into the fertilizer furrow as it is opened. The lower portion is fixedly attached to trailing face 22 of the fertilizer furrow opener. Tube 6, which connects at the top through inlet 13 to a fertilizer supply tank and metering apparatus, feeds fertilizer out through exit hole 2 into the furrow opened by first furrow opener 3. As stated above, the bottom portion of tube 6 may be flattened to reduce the width of opener 3 needed to accomodate tube 6. As shown in FIG. 6, tube 6 has foot portion 33 which prevents soil from entering tube 6 and obstructing the flow of fertilizer out of the tube.

Seed deflecting means 1, fixedly attached towards the bottom of trailing face 28 of the second furrow opener, has flat face 34 which is angled so that seeds 10 are deflected rearward and thereby prevented from falling into the seed furrow before the fertilizer furrow is covered with soil, that is, seeds are prevented from falling through the seed furrow into the fertilizer furrow. The useful angle of seed deflector 1 is about 10 to 60 degrees below horizontal. The leading segment of seed delecting means 1 has a hole or indented section to provide room for tube 6 to pass through.

As shown in FIG. 6, the apparatus attaches to seed feeding means 9 for feeding seed into the seed furrow opened by second furrow opener 4. Means 9 is hollow and provides a passage way for seed 10 through it to the seed furrow. Seeds which fall toward the leading edge of the shank are prevented by seed deflector 1 from falling into the seed furrow before the fertilizer furrow is self-filled with soil. Means 9 can be a shank such as a standard deep furrow grain drill boot shank as shown in FIG. 6. Attachment to the furrow opener may be by any desired means such as by bolts 11 through mounting holes 5. Shank 9 can be mounted to the lift frame of a seeding machine such as a grain drill (not shown) in any desired way, for example, by means of bracket 8, fixedly attached to shank 9 or may be integral with a cultivator. Seed tube 7 is fixedly attached to the upper opening of shank 9 and appropriately attached to the seed metering mechanism on the seeding machine to meter seed into shank 9. As shown in FIG. 6, fertilizer feed means 6 extends through shank 9. Other means of positioning tube 6 in relation to shank 9 known to those in the art are encompassed by the invention.

The apparatus of the invention operates through vertical and horizontal planes. The fertilizer and seed furrow are opened substantially simultaneously. As used in the specification and the claims, the phrase "substantially simultaneously" means that in the dynamic state, the fertilizer furrow and seed furrow are opened simultaneously in time and at slightly differential positions. The physical geometry of the apparatus is selected to accomplish the following dynamic sequence of events when the apparatus moves in the horizontal plane as designated by the arrow: (1) open a narrow first furrow, (2) open a wider second furrow above the first furrow, (3) feed fertilizer into the first furrow, (3) allow the first furrow to self-fill with soil, (4) feed seed into the second (upper) furrow, and (5) allow the second furrow to self-fill with soil.

The geometry of the apparatus to operate in the vertical plane is determined by: (1) the optimum depth of placement of seed below the soil surface as discussed above, (2) the depth of placement of fertilizer, and (3) the separation distance between the fertilizer and seed.

Dimension a, the horizontal distance between fertilizer exit 2 and seed deflector 1; dimension b, the vertical distance between forward-most soil engaging point 12 and bottom face 26 of furrow opener 4; and dimension c, the width of the first furrow opener, are important in determining the separation distance between the fertilizer and seed. The separation distance increases as dimensions a and b increase and c decreases. The separation distance which is optimum for a particular planting will vary depending on factors such as type of soil, soil water content, soil temperature, type of plant being seeded, seedling root system, and type and concentration of fertilizer. Dimensions b and c also determine the amount of soil disturbance below the seed furrow when the fertilizer furrow is opened. Dimension c should be narrow to minimize soil disturbance and avoid the creation of high ridges. Generally the width of c about is 5–13 mm. A width of not greater than 13 mm is preferred for most systems to assure that excessive soil disturbance does not occur when the fertilizer furrow is opened. The range of the ratio of dimension b to dimension c is generally about 3.8:1 to 20:1. Preferably, the range of the ratio of b to c is about 10:1 to 14:1. Dimension d, the width of the seed furrow opener, must be sufficient to move soil and crop residue away from the seed furrow while minimizing soil disturbance. Generally, the range of the ratio of dimension d to dimension c is about 2:1 to 15:1 and preferably about 5:1 to 12.5:1.

The following dimensions permit application of fertilizer at an optimum distance below seed at time of seeding with a minimum of soil disturbance when wheat seed is planted in silt loam soil using the apparatus of the invention as shown in FIG. 6 attached to a grain drill: dimension a, at least about 80 mm; dimension b, at least about 70 mm; dimension c, preferably not greater than about 13 mm; and dimension d, about 25-50 mm. Useful dimensions for placing other crop seed and fertilizer in other types of soil will be readily apparent to those in the art with reference to the parameters discussed above.

In operation, the furrow opening device is mounted to a seeding machine such as a grain drill by means of shank 9. As the seeding machine moves forward, shank 9 is lowered into the soil to the appropriate depth by means of the seeding machine lift mechanism. As known to those in the art, the correct depth is determined by the physical conditions of the soil and type of crop being seeded. As the furrow opening device moves forward with the opener point (12) engaged into the soil, first furrow opener 3 opens a narrow furrow in the soil for placement of fertilizer. Fertilizer is metered from the supply tank on the seeding machine and conveyed through tube 6 and deposited though exit hole 2 into the bottom of the furrow made by the first furrow opener. Soil falls into the fertilizer furrow immediately behind tube 6 at the back of opener 3 and covers the fertilizer in the fertilizer furrow. Second furrow opener 4 opens a seed furrow in the soil in the area above the fertilizer furrow, which is now covered over with soil, and moves dry surface soil and crop residue away from the seed furrow creating a seed zone surrounded by moist soil. Seed is metered from the supply tank on the seeding machine and conveyed through shank 9 and deposited in the bottom of the seed furrow. Seed deflector 1 assures that seeds 10 are directed rearward and therefore do not fall into the fertilizer furrow before it is filled. After the opener passes, soil flows into the seed furrow, thereby covering the seeds.

The following example is presented to further illustrate the method and apparatus of the invention and is not intended to limit the scope of the invention which is defined by the claims.

EXAMPLE

Referring to FIGS. 3-6, first furrow opening means 3 for opening a furrow for placement of fertilizer has narrow rectangular leading face 20 which curves forward from the top to the bottom and terminates at the bottom of means 3 at opener point 12 which is the forward-most soil engaging edge of the apparatus. Face 20 was sharpened as shown in FIG. 4 to aid in opening a narrow fertilizer furrow. The width of the fertilizer furrow opener, dimension c, was about 6 mm. The height of the fertilizer furrow opener, dimension b, was about 70 mm. Sides 21 of the fertilizer furrow opener 3 were flat surfaces having a length at the bottom of about 61 mm and a length at the top of about 73 mm.

The second furrow opening means (4) for opening a furrow for placement of seed was attached to the fertilizer furrow opening by welding the bottom face of the seed furrow opener to the top face of the fertilizer furrow opener. The seed furrow opener had a flat front and bottom furrow forming portion (31) which which had a width of about 32 mm, a vertical height of about 128 mm, and a bottom length which was about the length of the top face of the first furrow opener. The furrow forming portion was affixed to a body portion (30) of 4 which had a a width of 15 mm. The seed furrow opener was oriented with a lift angle of approximately 60 degrees to the horizontal. Side faces 27 were in a vertical place parallel to the direction of travel. The bottom face of the seed furrow opener was angled downward slightly (2°-3°) to the rear. Leading face 25 met tangentially with the leading face of the fertilizer furrow opener.

Fertilizer tube 6 was welded to the back of the fertilizer furrow opener and extended through shank 9. It was connected to a fertilizer supply tank and metering apparatus through inlet 13 and delivered fertilizer into the fertilizer furrow through exit hole 2.

Seed deflector 1 was a flat plate with the surface of the plate perpendicular to the direction of travel and oriented down and back forming an angle of approximately 30 degrees to the horizontal. The face of the seed deflector was about 37 mm long and 28 mm wide. The seed deflector was welded to the back of the trailing edge of opener 4 near the bottom. The horizontal distance between fertilizer exit 2 and seed deflector 1, distance a, was about 89 mm.

Shank 9 was an opener shank commonly used on deep furrow grain drills and had the shape shown in FIG. 6. It was attached to seed furrow opener 4 by means of bolts 11. Seed tube 7 was attached to the upper opening of the shank and connected to the seed metering mechanism on a grain drill. Shank 9 was mounted to the grain drill by means of bracket 8. Seed was metered into shank 9 and fell through the shank in the area behind the fertilizer tube.

Wheat was seeded in November in a Walla Walla, Washington, silt loam with seedbed soil water content of 24%. Eighty pounds of nitrogen as urea ammonium nitrate (32-0-0) and 80 pounds of Stephens wheat per acre were placed with the apparatus of the invention at two planting speeds (5.3 and 3.5 km/h) and two seed placement depths (3.1 and 5.1 cm). As the grain drill moved forward with the apparatus engaged into the soil, the first furrow opener (3) cut a slot approximately 6 mm wide and 89 mm deep into the soil. Fertilizer was metered from the supply tank to fertilizer tube 6 and fed into the first furrow through exit hole 2. After first furrow opener 3 and tube 6 passed through the soil, soil flowed back over the first furrow to cover the fertilizer. Above the first furrow, second furrow opener 4 opened a second wider furrow for seed. Seed was metered from the grain drill through shank 9 and dropped into the second furrow. Seed deflector 1 prevented seeds from falling into the seed furrow before the fertilizer in the first furrow self-filled with soil.

Incremental soil samples were taken in the row at the time of emergence and analyzed for $NH_4$ nitrogen to determine location of fertilizer. Depth of seed placement was measured by cutting plants off at the soil surface, excavating the subsurface portion of the plant, and measuring the distance from the seed to the point was cut. Stand counts were taken from 198 cm of row after emergence in each plot. The depth of furrows which remained in the field after the seed was covered with soil (ridges adjacent to the seed row) were measured after seeding.

The results are tabulated in Table 1. As can be seen from the data, excellent separation between seed and fertilizer was obtained. Increasing the planting speed from 3.5 to 5.3 km/h did not significantly (95% confidence level) influence separation between seed and fertilizer. The depth of the ridges adjacent the covered seed was only 64 mm. When seed and fertilizer were delivered under the same conditions using the USDA modified opener, supra, which was designed to deliver both seed and fertilizer in the same opener and to place fertilizer below the seed, the depth of the ridges adjacent to the covered seed was 114 mm.

It is understood that the foregoing detailed description is given merely by way of illustration and that modification and variations may be made therein without departing from the spirit and scope of the invention.

TABLE 1

| Planting depth | Planting Speed | | | | | | Mean separation distance |
|---|---|---|---|---|---|---|---|
| | 5.3 km/h | | | 3.5 km/h | | | |
| | Seed depth | NH$_4$—N depth | Separation distance | Seed depth | NH$_4$—N depth | Separation distance | |
| | | | cm | | | | |
| 3.1 | 3.3 | 7.1 | 3.8 | 2.8 | 6.9 | 4.1 | 3.95 B |
| 5.1 | 4.8 | 8.1 | 3.3 | 5.1 | 7.4 | 2.3 | 2.80 A* |
| Mean | | | 3.55 A | | | 3.20 A | |

*Within a column or row the same letter indicates no significant differences (p = 0.05).

What is claimed is:

1. An apparatus which permits application of fertilizer into the soil below seed at the time of seeding with minimum soil disturbance, which comprises:
   (a) a first furrow opening means for opening a narrow first furrow in the soil, said means having a width of 5 to 13 mm and a ratio of height to width of 3.8:1 to 20:1;
   (b) a second furrow opening means attached to said first furrow opening means for substantially simultaneously opening a second wider furrow above said first furrow;
   (c) fertilizer feeding means attached to said first furrow opening means for feeding fertilizer into said first furrow as it is opened by said first furrow opening means; and
   (d) seed deflecting means attached to said second furrow opening means for deflecting seed rearward and preventing seed from falling through said second furrow into said first furrow;
   wherein said first furrow opening means has an elongated rectangular leading face which curves downward and forward and terminates at an edge which is the forward-most soil engaging edge of said opening means, flat side faces, a flat top face, a trailing face, and a bottom face; and wherein said second furrow opening means has an elongated rectangular leading face which meets tangentially with said leading face of said first furrow opening means, a flat bottom face which is fixedly centered to said top face of said first furrow opening means, flat side faces, and a trailing face.

2. The apparatus as described in claim 1 which further comprises: (e) seed feeding means connected to said second furrow opening means for feeding seed into said second furrow.

3. The apparatus as described in claim 1 wherein said leading face of said first furrow opening means is sharpened to a knife edge.

4. The apparatus as described in claim 1 wherein said leading face of said second furrow opening means is pitched back to form a lift angle for imparting a lifting component as the soil fails.

5. The apparatus as described in claim 1 wherein said second furrow opening means comprises a body portion and a wider furrow forming portion located at said leading and bottom faces of said second furrow opening means and fixedly attached to said body portion.

6. The apparatus as described in claim 1 wherein said fertilizer feeding means is a hollow tube having a bottom portion which is fixedly attached to said trailing face of said first furrow opening means and which terminates at said bottom face of said first furrow opening means.

7. The apparatus as described in claim 6 wherein said bottom portion of said tube is flattened.

8. The apparatus as described in claim 6 wherein said fertilizer feeding means further includes a foot portion at the bottom of said tube to prevent soil from entering said tube.

9. The apparatus as described in claim 1 wherein said seed deflecting means is attached to said trailing face of said second furrow opener, adjacent to said fertilizer feeding means, and angled about 10 to 60 degrees below horizontal.

10. The apparatus as described in claim 1 which further includes seed feeding means attached to said second furrow opening means which comprises a hollow tube which terminates above said bottom face of said second furrow opening means.

11. The apparatus as described in claim 10 wherein said seed feeding means is an implement shank.

12. The apparatus as described in claim 4 wherein said ratio is about 10:1 to 14:1.

13. The apparatus as described in claim 4 wherein said second furrow opening means has a width such that the ratio of said width of said second opening means to said width of said first furrow opening means is about 2:1 to 15:1.

14. The apparatus as described in claim 13 wherein said ratio is about 5:1 to 12.5:1.

* * * * *